United States Patent [19]

Monroe

[11] Patent Number: 4,487,523

[45] Date of Patent: Dec. 11, 1984

[54] ACCESSORY CLAMP FOR ABDUCTOR BAR

[75] Inventor: Lawrence S. Monroe, Erie, Pa.

[73] Assignee: American Sterilizer Company, Erie, Pa.

[21] Appl. No.: 336,052

[22] Filed: Dec. 31, 1981

[51] Int. Cl.³ .............................................. F16B 2/18
[52] U.S. Cl. .................................. 403/385; 403/344;
403/389; 269/328; 269/238; 248/231.3; 24/516;
24/504; 24/498
[58] Field of Search ............... 269/322, 323, 328, 238,
269/236; 403/385, 389, 400, DIG. 9, 344;
128/80 A; 422/104, 99; 24/329, 333, 335, 337,
339, 338, 331, 248 E, 516, 504, 498; 292/256,
108; 248/225.4

[56] References Cited

U.S. PATENT DOCUMENTS

| | | | |
|---|---|---|---|
| 2,157,345 | 5/1939 | Nelson | 269/236 |
| 2,494,828 | 1/1950 | Mulder | 403/385 |
| 2,863,477 | 12/1958 | Sagerty | 269/197 |
| 3,046,072 | 7/1962 | Douglass et al. | 269/328 |
| 3,336,642 | 8/1967 | Armacost | 24/263 B |
| 3,339,913 | 9/1967 | Anderson | 269/328 |
| 3,806,107 | 4/1974 | Pitzer et al. | 269/188 |
| 4,018,412 | 4/1977 | Kees et al. | 24/248 E |
| 4,373,414 | 2/1983 | Agius | 269/66 X |
| 4,375,284 | 3/1983 | Doiron | 269/254 X |

FOREIGN PATENT DOCUMENTS

| | | | |
|---|---|---|---|
| 519524 | 3/1955 | Italy | 403/385 |
| 769477 | 3/1957 | United Kingdom | 403/385 |

Primary Examiner—Cornelius J. Husar
Assistant Examiner—Joseph A. Fischetti
Attorney, Agent, or Firm—Andrew J. Cornelius; Robert D. Yeager

[57] ABSTRACT

The present invention provides a clamp which can be used to secure an accessory member to an abductor bar of an orthopedic-surgical table. The clamp includes a clamp block pivotally mounted on the clamp and oriented with respect to the clamp to clamp an object therebetween. A lever having a cam surface is mounted on the clamp so that the cam surface coacts with the internal mechanism of the clamp to orient the clamp block in an unclamped, intermediate and clamped position. When the clamp is in the intermediate position, the clamp loosely engages the clamped object so that relative motion of the clamp and clamped object can occur. Because the clamp can be stabilized on the clamped object by orienting it in the intermediate position the operator does not need to use a second hand to prevent the clamp from falling off the clamped object while the first hand positions and tightens the clamp. Thus, the clamp can be secured to the clamped object in a one handed operation. The position of the lever reflects the position of the clamp block and thus indicates how tightly the clamp is secured to the clamped object.

7 Claims, 9 Drawing Figures

ACCESSORY CLAMP FOR ABDUCTOR BAR

BACKGROUND OF THE INVENTION

1. Field of the Invention

The invention relates generally to clamps and more specifically to accessory clamps for abductor bars of orthopedic-surgical tables.

2. Description of the Prior Art

Workers in the art have developed many types of clamping mechanisms. One type of mechanism involves a member such as a wing screw or knob wherein the member is turned in order to move a clamping plate back and forth with respect to the clamp. The clamped object is secured to the clamp through a direct wedging action.

In addition, levers can be used to effect a clamping action. For example, U.S. Pat. No. 3,046,072 teaches a clamping mechanism having a bifurcated cam lever which actuates a pull rod to cause a clamping plate to move back and forth with respect to the clamp.

A clamp is described in U.S. Pat. No. 3,339,913 (the "'913 patent") having a clamping mechanism that includes a bifurcated cam lever which, when rotated, actuates a pull rod which in turn rotates an L-shaped member within the internal mechanism of the clamp. Rotation of the L-shaped member in turn urges a clamp plate against an object, such as a side rail of a surgical table, to lock the clamp in place. The cam surface of the lever can be oriented in an unclamped or a clamped position. The clamp is intended for use with a side rail of the type shown in the '913 patent wherein the clamp and side rail having corresponding engaging surfaces so that when the clamp is mounted on the side rail with the cam lever oriented in the unclamped position it is slidably secured to the side rail and will not fall off. The position of the clamp on the side rail may be adjusted before the cam lever is placed in the clamped position in which the clamp is secured tightly to the rail. When the clamp is placed properly, the clamp is secured to the side rail by rotating the lever to orient the cam surface of the lever in the clamped position.

SUMMARY OF THE INVENTION

The present invention provides a clamp which can be used to secure an accessory member, such as a traction unit, to an abductor bar of an orthopedic-surgical table. The clamping mechanism of the present invention allows the clamp to be oriented in a position in which the clamp is mounted on and slidably secured to a clamped object. The operator does not need to use a second hand to prevent the clamp from falling off the clamped object while the first hand positions and tightens the clamp. Thus, the clamp can be secured to the clamped object in a one handed operation.

The clamp includes a frame defining a first clamping member. A second clamping member is secured to the frame for movement relative to the frame, and includes a contacting surface. The clamping members are so configured that they can be moved to an engaging position in which the clamp cannot be removed laterally from the object when the object is located between the clamping members. The clamp also includes an operator. Movement of the operator causes relative movement of the clamping members among an unclamped position, in which the clamp can be removed laterally from the object or in which the clamp can be moved laterally with respect to the object to locate the object generally between the clamping member, an intermediate clamping position, in which (i) the clamping members are in their engaging position and (ii) the clamp can be slid along the object to position the clamp at a desired location along the object, and a fully clamped position, in which (i) the clamping members are in their engaging position and (ii) the clamp is securely fixed to the object, when the object is located between the clamping members, to prevent the clamp from sliding along the object.

The operator defines a cam surface having two separate actuating surfaces adapted to individually engage and become seated on the contacting surfaces to provide two stable clamping positions of the operator. Movement of the operator to a position wherein neither actuating surface is seated on the contacting surface permits the clamping members to assume their unclamped position. Movement of the operator to a second position wherein a first actuating surface becomes seated on the contacting surface causes the clamping members to assume their intermediate clamping position. Movement of the operator to a third position wherein a second actuating surface becomes seated on the contacting surface causes the clamping members to assume their fully clamped position.

DETAILED DESCRIPTION OF THE PREFERRED EMBODIMENTS

Figure 1:
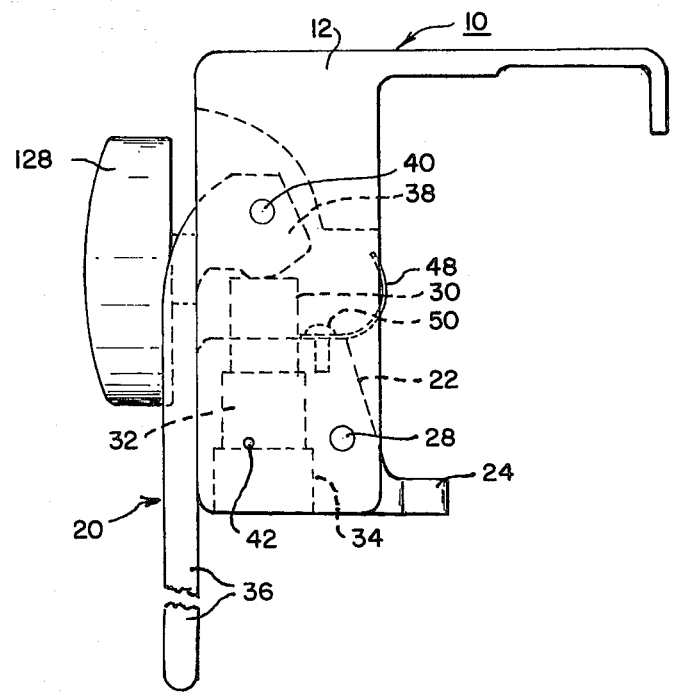
FIG. 1 is a side elevational view of a clamp in its fully clamped position constructed according to the provisions of the present invention.
Figure 2:
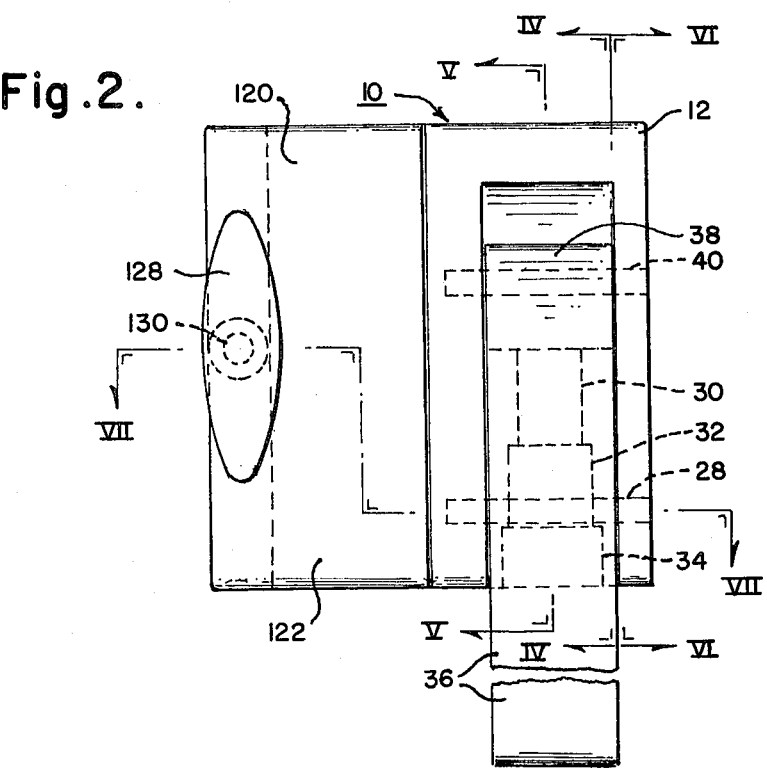
FIG. 2 is a front elevational view of the clamp shown in FIG. 1.

Referring to FIGS. 1 through 10, the preferred embodiment of the present invention, clamp 10, is shown in a form useful for mounting an accessory member on the abductor bar 11 of a surgical table. Clamp 10 includes a frame such as clamp body 12, clamping mechanism 20 for securing clamp 10 to a rigid member such as an abductor bar of an orthopedic-surgical table and clamping mechanism 120 for securing an accessory member such as a traction unit to clamp 10.

Clamping mechanism 20 includes a movable member such as clamp block 22 which is pivotally mounted to clamp body 12. Clamp body 12 defines a first clamping member such as clamping flange 13. Clamp block 22 has a second clamping member such as projection 24 which extends outwardly from the lower edge of clamp block 22. Projection 24 of clamp block 22 and clamping flange 13 of clamp body 12 form an opening 26 sufficient to receive an abductor bar. Pin 28 secures clamp block 22 to clamp body 12. Clamp body 12 defines flanges 23 and 25. Pin 28 passes through clamp block 22 and is secured at its ends to flanges 23 and 25. Plunger 30 is mounted within passage 33 of clamp block 22 to be in contact with Belleville spring 32 disposed within passage 33 directly below plunger 30. Spring retainer 34, disposed directly below Belleville spring 32, is threaded into the threaded portion of passage 33. Spring retainer 34 prevents Belleville spring 32 and plunger 30 from exiting clamp block 22 through passage 33.

Clamping mechanism 20 also includes an operator such as lever 36 which is pivotally mounted on clamp body 12. The head 38 of lever 36 has a cam surface 37 adapted to contact surface 31 of plunger 30 and orient projection 24 and clamping flange 13 in unclamped, intermediate clamping and fully clamped positions. Cam surface 37 consists of a first actuating surface, such as actuating surface 201, and a second actuating surface, such as actuating surface 202, which are adapted to contact surface 31 of plunger 30. As lever 36 is rotated downwardly, cam, surface 37 of head 38 contacts and depresses plunger 30 further into clamp block 22, thereby rotating block 22 about pin 28. Pin 40 secures lever 36 to clamp body 12. Pin 40 passes through head 38 and is secured at its ends to flanges 23 and 25. The force which must be exerted on lever 36 to move clamp block 22 can be adjusted by rotating spring retainer 34 to change its position relative to clamp block 22.

Clamp block 22 is prevented from being rotated too far by pin 42 which is secured to flange 23 and extends through flange 23 and into shallow depression 44 defined by clamp block 22. Pin 42 strikes the side wall 43 of depression 44 upon rotation of clamp block 22 to its desired limit of rotation. Hole 46 at the bottom of depression 44 in clamp block 22 allows for disassembly of pin 42 after clamp block 22 has been rotated to align hole 46 with pin 42, and spring retainer 34, Belleville spring 32 and plunger 30 have been removed from clamp block 22.

Figure 5:
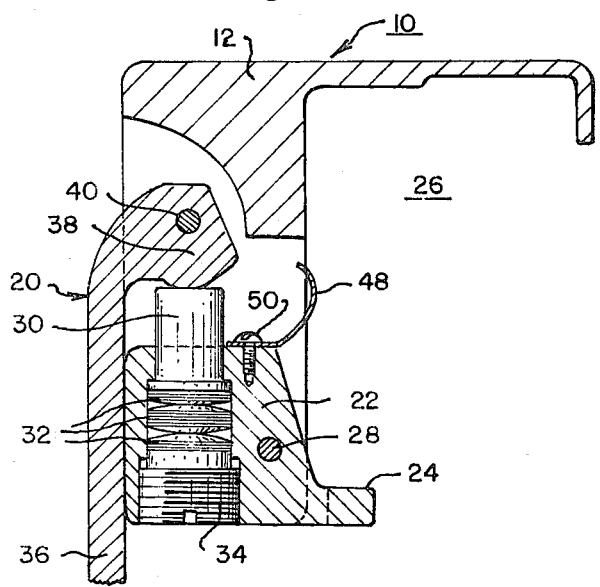
FIG. 5 is a sectional view of the clamp shown in FIG. 2 taken along the line V—V.
Figure 6:
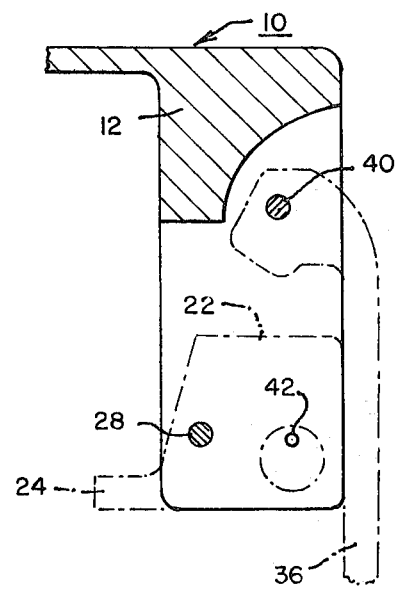
FIG. 6 is a sectional view of the clamp shown in FIG. 2 taken along the line VI—VI.
Figure 8:
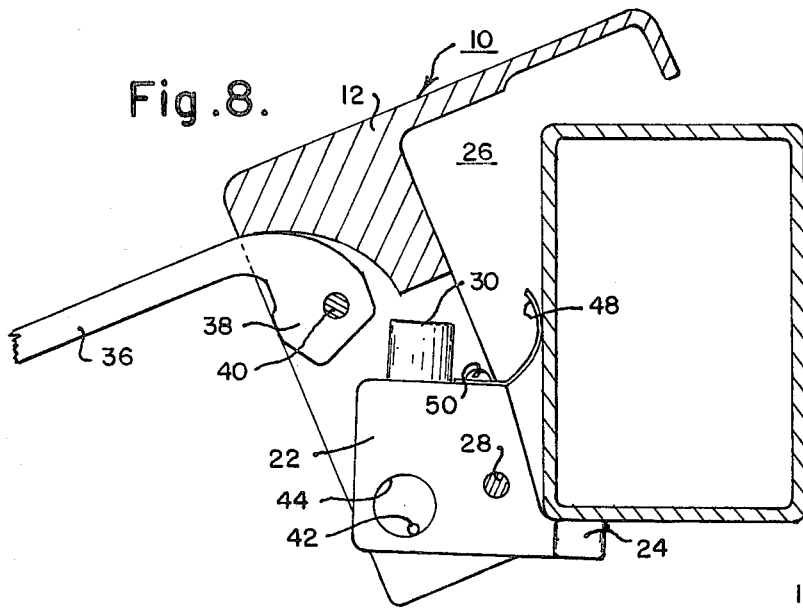
FIG. 8 is a side view of the clamp shown in FIG. 1 with a portion of the clamp body cut away, showing the clamp in its unclamped position and showing a section of an abductor bar.
Figure 9:
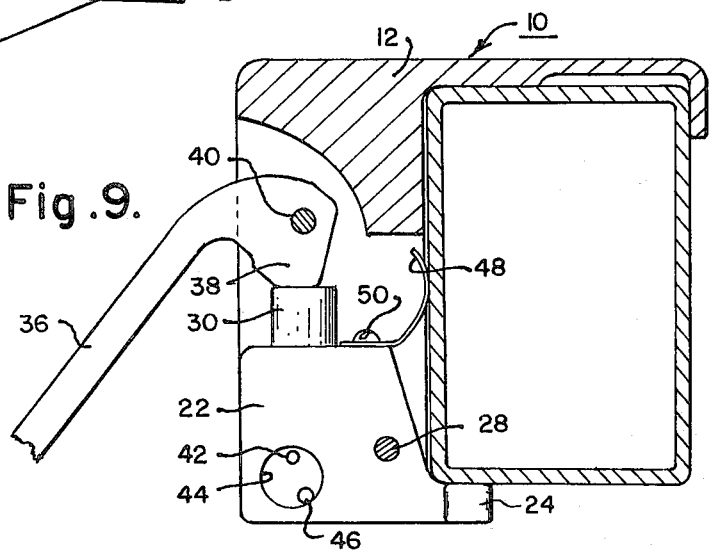
FIG. 9 is a side view of the clamp shown in FIG. 1 with a portion of the clamp body cut away, showing the clamp in its intermediate clamping position.

FIG. 8 shows clamping flange 13 and projection 24, and clamp 10, in an unclamped position, in which the clamp can be removed laterally from abductor bar 11 or in which clamp 10 can be moved laterally with respect to abductor bar 11 to locate the abductor bar generally between clamping flange 13 and projection 24. To place clamp 10 in an unclamped position, head 38 of lever 36 is rotated until neither actuating surface 201 nor actuating surface 202 of cam surface 37 is seated on surface 31 of plunger 30. FIG. 9 shows clamping flange 13 and projection 24, and clamp 10, in an intermediate clamping position, in which clamping flange 13 and projection 24 cooperate to prevent removal of clamp 10 laterally from abductor bar 11, but in which the clamp can be slid along abductor bar 11 to position the clamp at a desired location along abductor bar 11. Clamp 10 can be placed in an intermediate clamping position by rotating lever 36 until actuating surface 201 of head 38 is engaged with and seated on surface 31 of plunger 30, as is shown in FIG. 9. FIG. 5 shows clamping flange 13 and projection 24, and clamp 10, in a fully clamped position, in which clamping flange 13 and projection 24 cooperate to prevent removal of clamp 10 from abductor bar 11, and in which the clamp is securely fixed to abductor bar 11 to prevent the clamp from sliding along abductor bar 11. Clamp 10 can be placed in its fully clamped position by causing clamp 10 and the abductor bar 11 to assume their relative position shown in FIG. 9 and then rotating lever 36 until actuating surface 202 becomes engaged with and seated on surface 31 of plunger 30.

Positioning spring 48, attached to clamp block 22 by screw 50, is adapted to contact the abductor bar as clamp 10 is placed on the bar to position clamping mechanism 20 properly.

Figure 3:
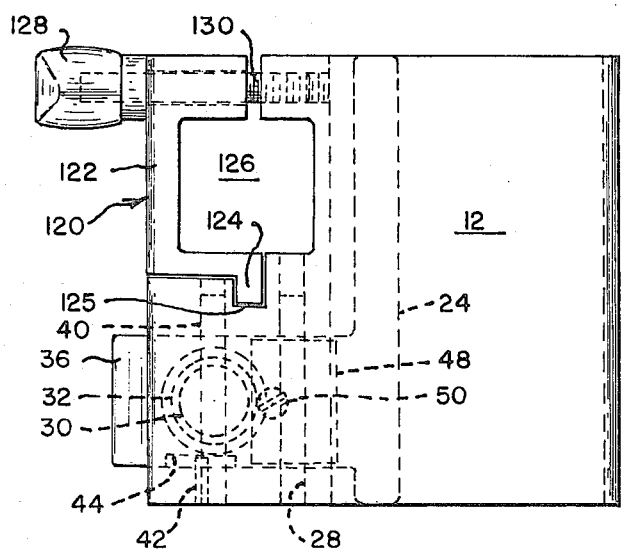
FIG. 3 is a top plan view of the clamp shown in FIG. 1.
Figure 7:
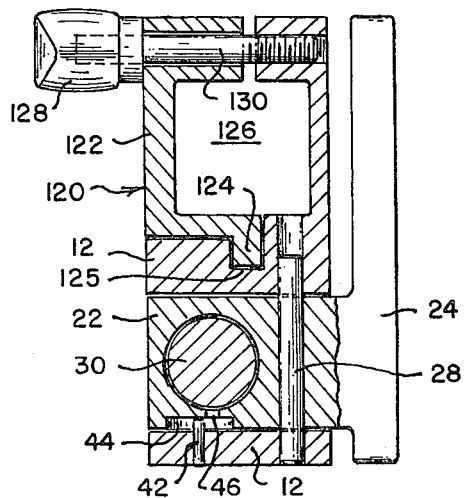
FIG. 7 is a sectional view of the clamp shown in FIG. 1 taken along the line VII—VII, with the lever 36 removed.
Figure 10:
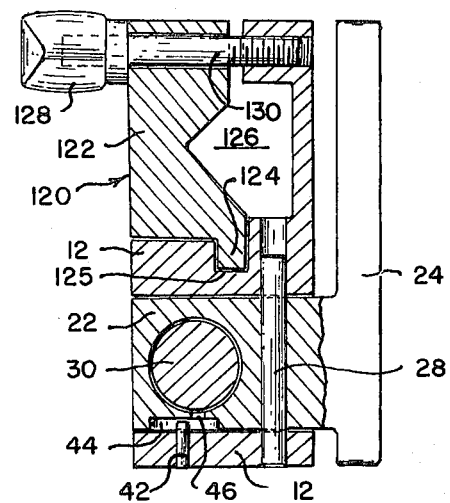
FIG. 10 is a sectional view of another embodiment of the present invention having a clamp plate with a V-shaped clamping surface.

Clamping mechanism 120, as shown in FIGS. 3, 7 and 10, includes clamp plate 122 having a short leg 124 which fits into depression 127 in clamp body 12. Clamp plate 122 and clamp body 12 form an opening 126 adapted to receive an accessory bar. As shown in the figures, the inner edge of clamp plate 122 can be of varying configurations so that clamping mechanism 120 may be used to secure varying shapes of accessory bars to clamp 10. Opening 126 extends in a direction perpendicular to that of opening 26. Wing screw 128 has member 130 which extends horizontally through the top of clamp plate 122 and into clamp body 12.

To mount clamp 10 on an abductor bar of an orthopedic-surgical table, lever 36 is moved to the position shown in FIG. 8, in which position the cam surface of head 38 is not in contact with plunger 30, and clamp block 22 is free to pivot about pin 28. As clamp block 22 is pivoted clockwise with respect to clamp body 12, projection 24 of clamp block 22 moves to enlarge opening 26 of clamp 10 until clamp 10 can be laterally placed on the abductor bar, at which time projection 24 and clamping flange 13 are in their unclamped position. When the clamp is properly placed on the abductor bar, the abductor bar extends through opening 26 and projection 24 extends from clamp 10 beneath the abductor bar.

As member 22 is rotated clockwise with respect to clamp body 12 about pin 28, the side 43 of shallow depression 44 contacts pin 42 thus preventing any further clockwise rotation of clamp block 22.

As clamp 10 is placed on the abductor bar, the abductor bar contacts positioning spring 48. As the contact occurs, positioning spring 48 rotates clamp block 22 counterclockwise so that plunger 30 confronts the cam surface of head 38 of lever 36.

Once clamp 10 has been placed on the abductor bar with projection 24 and clamping flange 13 in their unclamped position, lever 36 is rotated until actuating surface of head 38 is in contact with the top of plunger 30 as shown in FIG. 9 and in which position projection 24 of clamp block 22 and clamping flange 13 are in their intermediate clamping position. Clamp block 22 is not free to rotate about pin 28 and clamp 10 can be slid along the abductor bar to a desired position.

Figure 4:
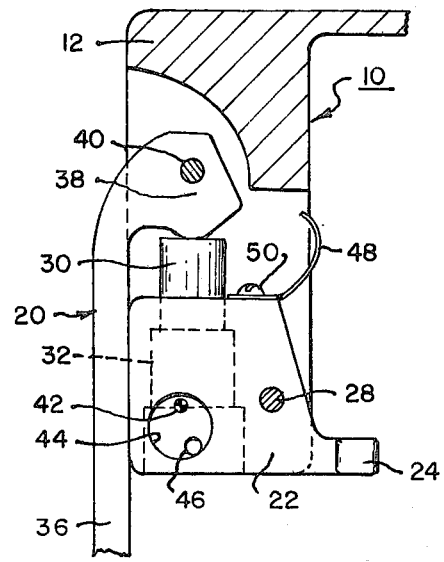
FIG. 4 is a sectional view of the clamp shown in FIG. 2 taken along the line IV—IV.

When clamp 10 is positioned properly, lever 36 is moved to the position, as shown in FIGS. 1, 4 and 5, in which projection 24 and clamping flange 13 are in their fully clamped position. Actuating surface 202 of head 38 depresses plunger 30 within clamp block 22 and further rotates clamp block 22 counterclockwise so that clamp 10 is secured tightly to the abductor bar and is no longer free to move along the abductor bar. Projection 24 and clamping flange 13 are in their fully clamped position.

An accessory member is secured to clamp 10 by loosening wing screw 128 to allow clamp plate 122 to move away from clamp body 12 until opening 126 is sufficient to accommodate an accessory member. When the accessory member is positioned properly, wing screw 128 can be tightened until the accessory member is wedged tightly in opening 126 between clamp body 12 and clamp plate 122.

What is claimed is:

1. A clamp which can be releasably secured to an elongated object comprising:
   a frame defining a first clamping member;
   a movable member which defines a second clamping member secured to said frame for movement relative to said frame, said movable member including a contacting surface;
   said first and second clamping members being so configured that said clamping members can be moved to an engaging position in which said clamp cannot be removed laterally from the object when the object is located between said clamping members; and
   an operator, movement of said operator causing relative movement of said clamping members among an unclamped position, in which said clamp can be removed laterally from the object or in which said clamp can be moved laterally with respect to the object to locate the object generally between said clamping members, an intermediate clamping position, in which (i) said clamping members are in their engaging position and (ii) said clamp can be slid along the object to position said clamp at a desired location along the object, and a fully clamped position, in which (i) said clamping members are in their engaging position and (ii) said clamp is securely fixed to the object, when the object is located between said clamping members, to prevent said clamp from sliding along the object;
   said operator defining a cam surface having two separate actuating surfaces adapted to individually engage and become seated on said contacting surface to provide two stable clamping positions of said operator, movement of said operator to a position wherein neither said actuating surface is seated on said contacting surface permitting said clamping members to assume their said unclamped position, movement of said operator to a second position wherein a first said actuating surface becomes seated on said contacting surface causing said clamping members to assume their said intermediate clamping position, and movement of said operator to a third position wherein a second said actuating surface becomes seated on said contacting surface causing said clamping members to assume their said fully clamped position.

2. A clamp as recited in claim 1 further comprising means mounted on said frame for securing an accessory member to said clamp.

3. A clamp as recited in claim 1 wherein said clamp is adapted to be secured to an abductor bar of an orthopedic-surgical table.

4. A clamp as recited in claim 1 wherein said first member is a clamp block pivotally mounted on said frame, said operator is a lever, having a handle and a head, the head of said lever defining said cam surface wherein said lever is adapted to rotate said cam surface to bring said actuating surfaces into engagement with said contacting surface.

5. A clamp as recited in claim 4 wherein said movable member includes a plunger adapted for movement into and out of said clamp block, said contacting surface being defined by said plunger, when said lever causes said clamping members to assume their unclamped position said cam surface of said lever is not in contact with said contacting surface, when said lever causes said clamping members to assume their intermediate clamping position, said first actuating surface of said cam surface contacts and exerts a first magnitude of force against said contacting surface of said plunger, and when said lever causes said clamping members to assume their said fully clamped position said second actuating surface of said cam surface of said lever contacts and exerts a second magnitude of force against said contacting surface of said plunger, said second magnitude being greater than said first magnitude.

6. A clamp as recited in claim 5 further comprising means for adjusting said magnitudes of force.

7. A clamp as recited in claim 5 further comprising means for biasing said plunger toward positions of decreased insertion within said clamp block.

* * * * *